UNITED STATES PATENT OFFICE.

JAMES B. GREENE, OF ELLIOTT, CALIFORNIA.

IMPROVEMENT IN HARROWS.

Specification forming part of Letters Patent No. 167,449, dated September 7, 1875; application filed May 17, 1875.

*To all whom it may concern:*

Be it known that I, JAMES B. GREENE, of Elliott, San Joaquin county, State of California, have invented an Improved Harrow; and I do hereby declare the following description and accompanying drawings are sufficient to enable any person skilled in the art or science to which it most nearly appertains to make and use my said invention or improvement without further invention or experiment.

My invention relates to that class of harrows in which the harrow-teeth are secured in two or more shafts which extend transversely across the harrow-frame, so that the shaft or shafts can be rotated in order to free the teeth from the accumulations of straw, weeds, and other obstacles.

My improvement consists in the employment of certain devices by which these shafts are caused to rotate automatically and successively, so as to free themselves of weeds and straw.

In order to describe my improved harrow so that others will be able to understand its construction and operation, reference is had to the accompanying drawings forming a part of this specification, in which—

Figure 1:
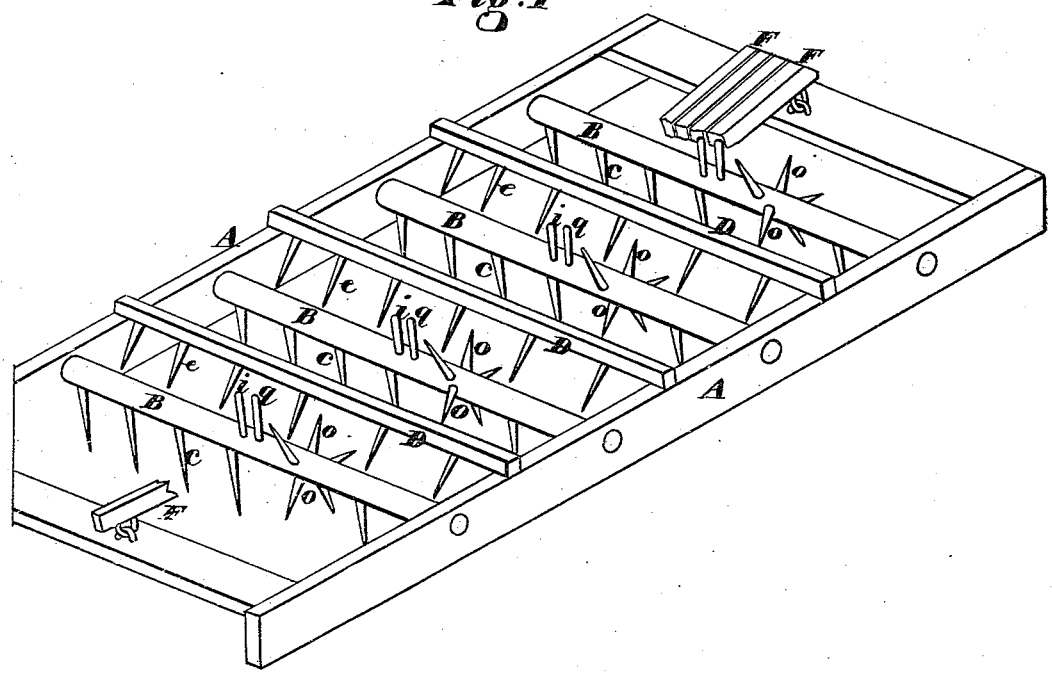
Figure 2:
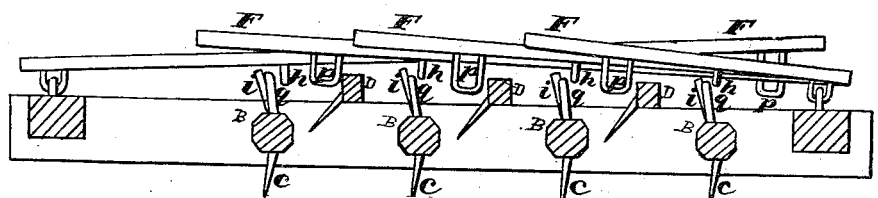

Figure 1 is a perspective view of my harrow. Fig. 2 is a longitudinal section.

A is the frame of my harrow, which can be made in any desired form. B B are shafts which extend across this frame transversely to the line of draft, their ends being supported loosely in the sides of the frame, so that they can rotate independent of each other. As many of these shafts can be employed as desired. On the under side of each shaft B I secure a row of teeth, *c c c*, and these teeth are kept in the proper position to serve as harrow-teeth by the devices hereinafter described. A fixed bar, D, extends across the harrow-frame a short distance in the rear of each shaft B, its opposite ends being supported upon and secured to the upper edges of the side rails of the frame A, so that the bar will be above the shaft B. These bars are provided with a number of teeth, *c c c*, which project downward at an angle, and which alternate with the teeth on the shaft B in front of it, so that when the shaft B rotates its teeth will pass between the stationary teeth of the fixed bar, and thus clear themselves of any weeds, straw, or other obstruction which may cling to them. In order to retain the shafts B B in their working or harrowing position, and to operate them automatically, I employ as many hinged bars or levers F as there are shafts B in the harrow. Each lever or bar F has one end hinged or otherwise loosely attached to one of the end timbers of the harrow-frame, so that they will lie upon and across the stationary bars D. One end of each lever or bar F will, therefore, be free, while its opposite end is hinged or loosely attached to the frame, so that its free end can be readily lifted independently. Each bar or lever F has a projection or pin, *h*, on its under side, directly above one of the rotating shafts B. To the upper side of each shaft B, and directly opposite the row of harrow-teeth *c*, I secure a stop-pin, *i*, in line with the projection or pin *h* on the under side of the bar or lever F, so that this pin *i* will strike against the stop-projection *h*, and hold the shaft in its harrowing position with its teeth in the ground, but when the free end of the hinged lever is raised the stop-pin *i* is released, so that the shaft can rotate. In order to cause each shaft to rotate when its holding-lever is lifted, I secure two or more spikes or teeth, *o*, radially around it in the manner of spokes, so that they will catch in the ground, and carry the shaft around after each lift of the lever.

It is evident, therefore, that if the free end of these levers are raised successively, the shafts D will be allowed to rotate successively, and that the clearing-teeth *e e* will relieve the harrow-teeth from the accumulations of straw or other matter at each revolution.

I have, therefore, devised a plan by which the rotation of each shaft D is caused to automatically lift the free end of the lever which holds the shaft just in rear of it, and so that the rear shaft will lift the lever which holds the forward shaft in its harrowing position, thus rendering the harrow self-acting, as the operation of one shaft causes the following one to operate. To do this I secure to the under side of each lever, directly over the shaft which is in advance of the one which it stops, a loop or other projection, *p*, and to the shaft below it I attach a trip or lifting projection, *q*, so that, when the forward shaft makes its ro-

J. B. GREENE.
Harrow.

No. 167,449. Patented Sept. 7, 1875.

Witnesses
Geo. H. Strong.
Jno. L. Borne

Inventor
James B. Greene
by Dewey &
Attys